United States Patent
Cocchi et al.

(10) Patent No.: US 10,477,878 B2
(45) Date of Patent: *Nov. 19, 2019

(54) METHOD FOR MAKING LIQUID OR SEMI-LIQUID PRODUCTS AND MACHINE TO IMPLEMENT THE METHOD

(71) Applicant: ALI S.p.A.—CARPIGIANI GROUP, Milan (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,846

(22) Filed: Sep. 29, 2017

(65) Prior Publication Data

US 2018/0098554 A1    Apr. 12, 2018

(30) Foreign Application Priority Data

Oct. 7, 2016   (IT) ........................ 102016000100959

(51) Int. Cl.
*A23G 9/18*    (2006.01)
*A23G 9/22*    (2006.01)
(Continued)

(52) U.S. Cl.
CPC .............. *A23G 9/222* (2013.01); *A23G 9/045* (2013.01); *A23G 9/18* (2013.01); *A23G 9/228* (2013.01);
(Continued)

(58) Field of Classification Search
CPC .............. A23G 9/12; A23G 9/14–9/20; A23G 9/28–9/283; A23G 9/287; A23G 9/224;
(Continued)

(56) References Cited

U.S. PATENT DOCUMENTS 1,861,082 A * 5/1932 Gardner .................... A23G 9/18
165/75
2,608,833 A * 9/1952 Woodruff ............... A23G 9/163
366/144
(Continued)

FOREIGN PATENT DOCUMENTS

EP    0059329 A2    9/1982
EP    0496441 A1    7/1992
(Continued)

OTHER PUBLICATIONS

Italian Search Report dated May 8, 2017 from counterpart Italian App No. IT 201600100959.
(Continued)

*Primary Examiner* — Drew E Becker
(74) *Attorney, Agent, or Firm* — Shuttleworth & Ingersoll, PLC; Timothy J. Klima

(57) ABSTRACT

A machine for making liquid or semi-liquid products, includes: a first processing container for processing a basic liquid or semi-liquid product and defining a processing chamber; a cooling cylinder mounted inside the first container; a second processing container; a connecting duct between the first container and the second container; a dispensing device associated with the first processing container and configured, in a dispensing configuration, to deliver the liquid or semi-liquid product to the outside or, in an inhibiting configuration, to prevent the liquid or semi-liquid product from being dispensed; and a shutoff valve configured, in a closed configuration, to close the connecting duct between the first container and the second container or, in an open configuration, to open the connecting duct between the first container and the second container.

15 Claims, 5 Drawing Sheets

(51) Int. Cl.
  *A23G 9/28* (2006.01)
  *A23G 9/04* (2006.01)
(52) U.S. Cl.
  CPC .............. *A23G 9/28* (2013.01); *A23G 9/281* (2013.01); *A23G 9/288* (2013.01); *A23G 9/224* (2013.01)
(58) Field of Classification Search
  CPC .......... A23G 9/045–9/06; A23G 9/222; A23G 9/228; A23G 9/288
  USPC .................................................. 426/524, 515
  See application file for complete search history.

(56) References Cited

U.S. PATENT DOCUMENTS

| | | | | |
|---|---|---|---|---|
| 2,746,640 | A * | 5/1956 | Swenson | A23G 9/166 222/440 |
| 2,767,553 | A * | 10/1956 | Lewis | A23G 9/20 137/625.11 |
| 3,045,441 | A * | 7/1962 | Patch | A23G 9/16 62/135 |
| 3,477,244 | A * | 11/1969 | Scoggins | A23G 9/045 62/306 |
| 3,479,835 | A * | 11/1969 | Lane | G07F 17/0071 62/135 |
| 3,517,524 | A | 6/1970 | Fiedler et al. | |
| 3,818,716 | A | 6/1974 | Carpigiani | |
| 3,858,498 | A * | 1/1975 | Swenson | A23G 9/163 62/342 |
| 3,866,801 | A * | 2/1975 | Stapleton | A23G 9/166 222/146.6 |
| 4,412,428 | A * | 11/1983 | Giannella | A23G 9/281 366/155.1 |
| 4,653,281 | A | 3/1987 | Van Der Veer | |
| 4,817,396 | A * | 4/1989 | Menzel | A23G 9/163 62/306 |
| 5,201,861 | A | 4/1993 | Menzel | |
| 5,916,248 | A * | 6/1999 | Bravo | A23G 9/163 426/519 |
| 6,149,035 | A * | 11/2000 | Gorski | A47J 31/401 222/129.4 |
| 6,446,835 | B1 * | 9/2002 | Ford | B67D 1/0042 222/146.6 |
| 9,326,531 | B1 * | 5/2016 | Reich | A23G 9/28 |
| 2008/0023486 | A1 * | 1/2008 | Kadyk | A23G 9/045 222/64 |
| 2008/0202130 | A1 | 8/2008 | Kadyk | |
| 2010/0101235 | A1 * | 4/2010 | Cocchi | A23G 9/16 62/1 |
| 2011/0168735 | A1 * | 7/2011 | Van Zeeland | A23G 9/045 222/1 |
| 2012/0055189 | A1 | 3/2012 | Sipp et al. | |
| 2012/0223094 | A1 | 9/2012 | Rickard, Jr. et al. | |
| 2013/0269540 | A1 * | 10/2013 | Lazzarini | A23C 9/1223 99/455 |
| 2013/0327080 | A1 * | 12/2013 | Sipp | A23G 9/04 62/342 |
| 2014/0196476 | A1 * | 7/2014 | Petersen | A23G 9/163 62/66 |
| 2014/0356494 | A1 * | 12/2014 | Cocchi | A23G 9/28 426/231 |
| 2015/0289539 | A1 * | 10/2015 | Noth | B01F 7/00458 222/1 |
| 2015/0320079 | A1 * | 11/2015 | Minard | A23G 9/166 222/1 |
| 2018/0098553 | A1 * | 4/2018 | Cocchi | A23G 9/12 |

FOREIGN PATENT DOCUMENTS

| | | | |
|---|---|---|---|
| EP | 2277386 A2 | 1/2011 | |
| EP | 2478774 A1 | 7/2012 | |
| EP | 2805620 A1 | 11/2014 | |
| EP | 2932855 A1 | 10/2015 | |
| EP | 3028581 A1 | 6/2016 | |
| EP | 3045048 A1 | 7/2016 | |
| GB | 1486886 A | 9/1977 | |
| WO | WO2011081301 A2 | 7/2011 | |
| WO | WO-2014067913 A2 * | 5/2014 | .......... B01F 7/00458 |

OTHER PUBLICATIONS

Cocchi—U.S. Appl. No. 15/723,230, filed Oct. 3, 2017 [Now U.S. Pat. No. 10,321,700 issued Jun. 18, 2019].

Italian Search Report dated Jun. 9, 2017 from related Italian App No. IT 10201600100948.

* cited by examiner

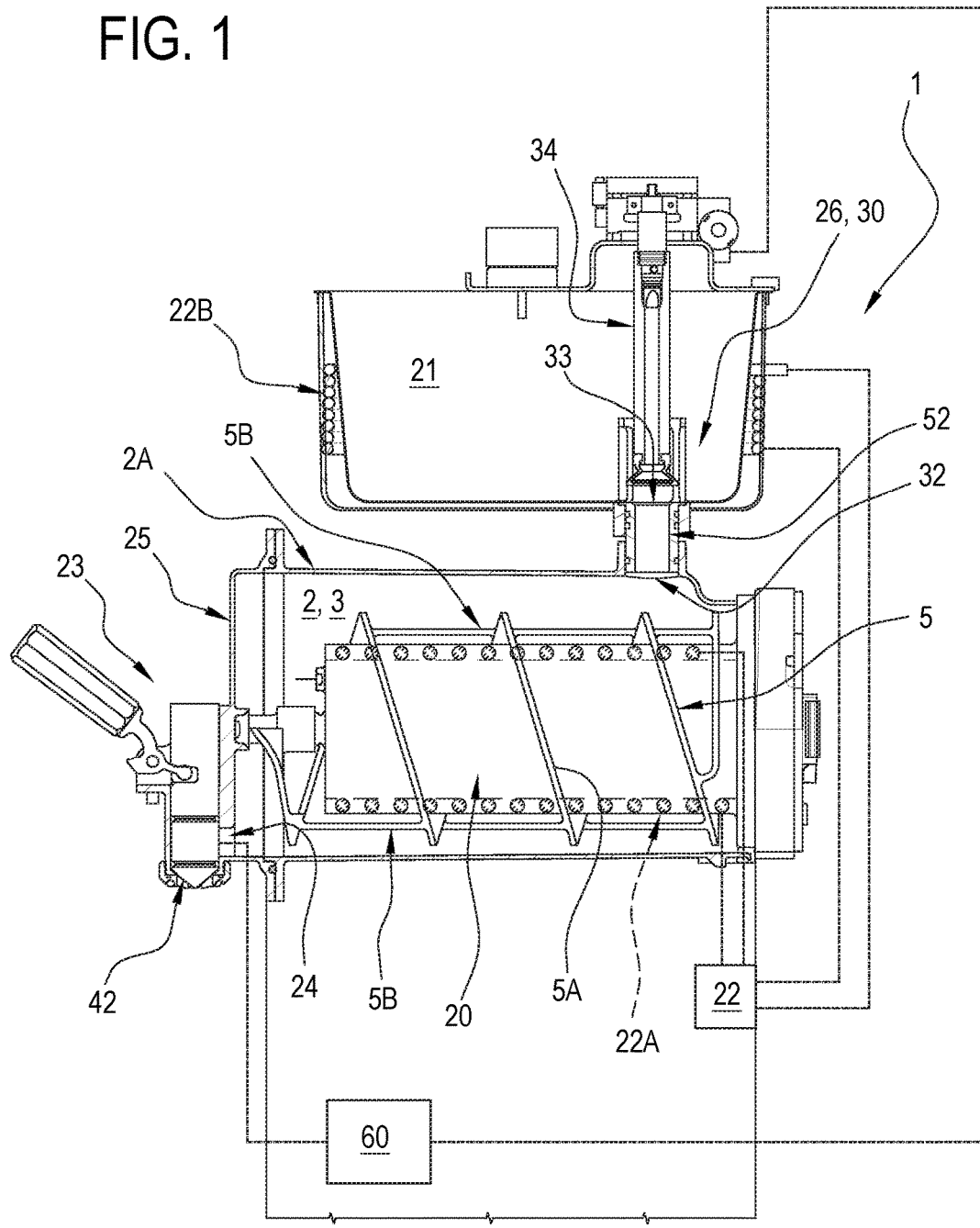

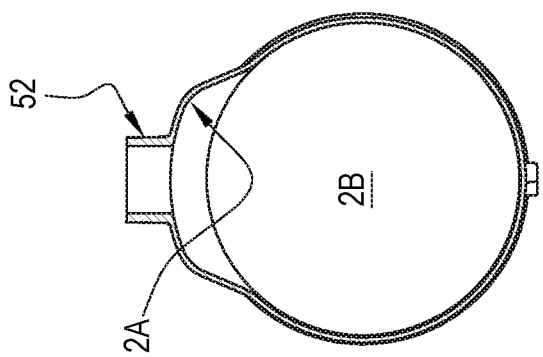
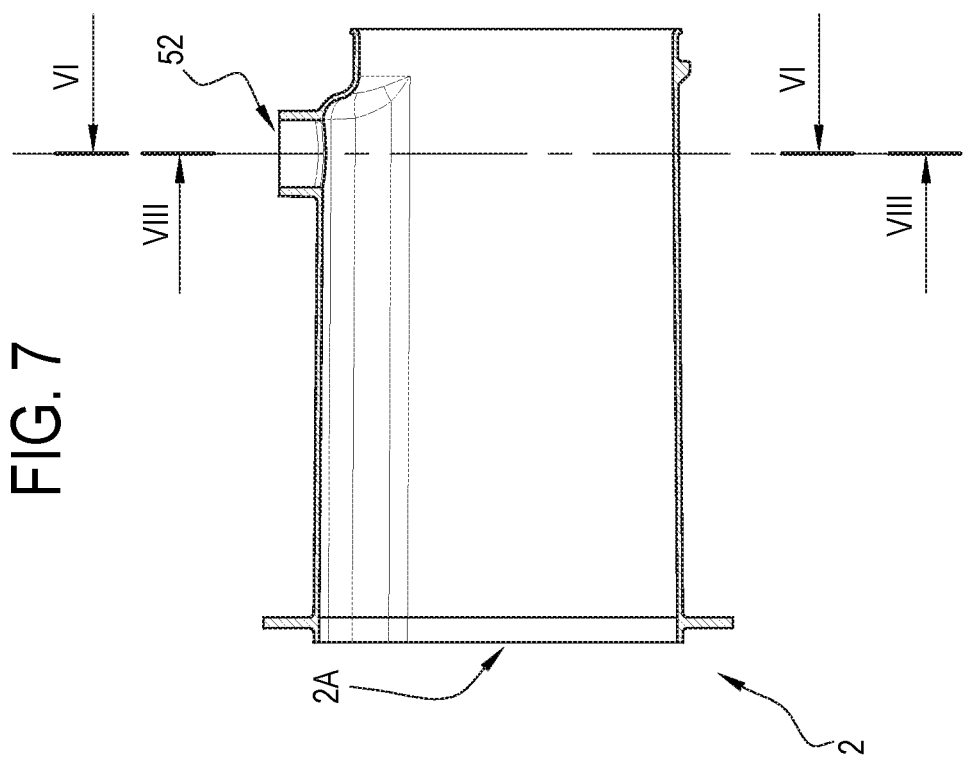
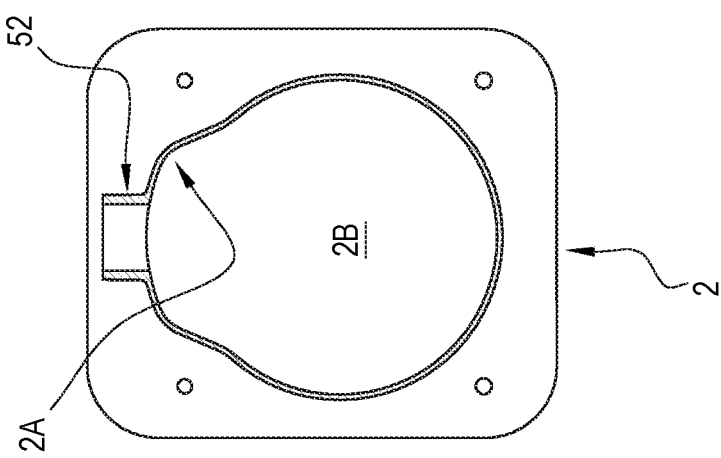

METHOD FOR MAKING LIQUID OR SEMI-LIQUID PRODUCTS AND MACHINE TO IMPLEMENT THE METHOD

This application claims priority to Italian Patent Application 102016000100959 filed Oct. 7, 2016, the entirety of which is incorporated by reference herein.

BACKGROUND OF THE INVENTION

This invention relates to a method for making liquid or semi-liquid products and a machine configured to implement this method.

In the sector concerned there is a strongly felt need for production methods and machines which allow making high-quality liquid or semi-liquid food products with a high level of repeatability.

Another strongly felt need in the sector is that for production methods and machines which allow making liquid or semi-liquid food products in a particularly quick and easy manner.

SUMMARY OF THE INVENTION

The aim of this invention is to provide a method and a machine for making a liquid or semi-liquid product, specifically ice cream, and which allow the above mentioned needs to be met.

More precisely, the aim of this invention is therefore to provide a method and a machine for making a liquid or semi-liquid product, specifically ice cream, and which allow obtaining a liquid or semi-liquid product of high quality (with a good level of repeatability).

More precisely, the aim of this invention is therefore to provide a method and a machine for making a liquid or semi-liquid product, specifically ice cream, and which allow obtaining a liquid or semi-liquid product particularly rapidly.

Yet another aim of this invention is to provide a method and a machine for making a liquid or semi-liquid product, specifically ice cream, and whose operation is particularly simple and effective.

According to the invention, this aim is achieved by a method and a machine for making liquid or semi-liquid products and comprising the technical features set out in one or more of the appended claims.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate a preferred, non-limiting embodiment of the invention and in which:

FIG. 1 is a schematic view of a first embodiment of a machine according to this invention;

FIGS. 4 to 8 are respective schematic views of another detail of the machine of FIG. 1, forming the object of this invention;

DESCRIPTION OF THE PREFERRED EMBODIMENTS

Figure 3:
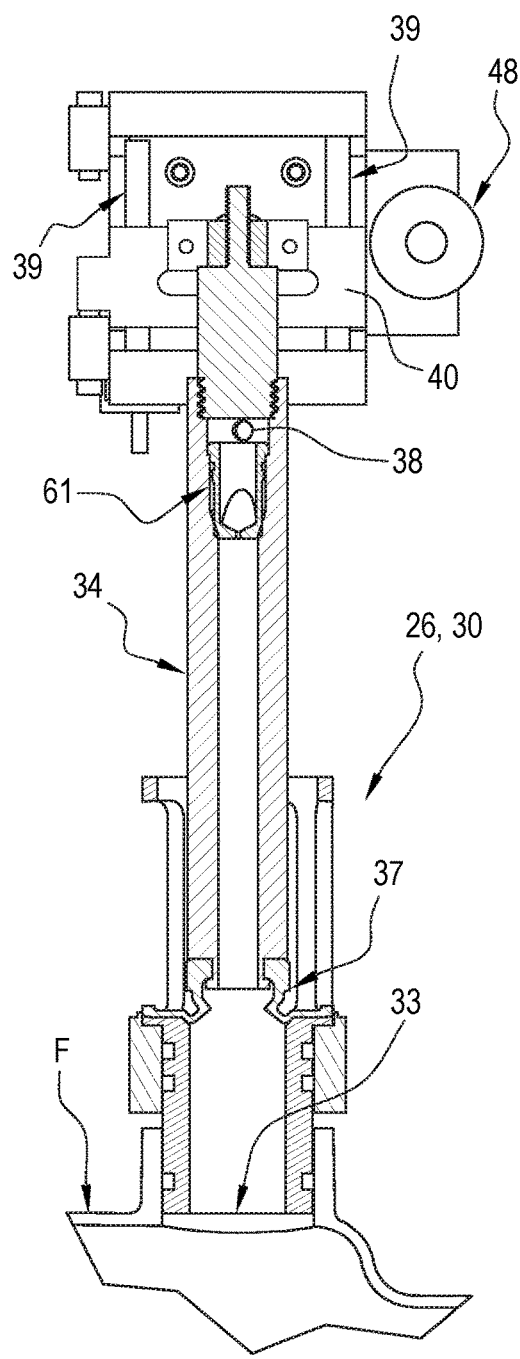
FIGS. 2 and 3 are respective schematic views of a detail of the machine of FIG. 1, forming the object of this invention.
Figure 2:
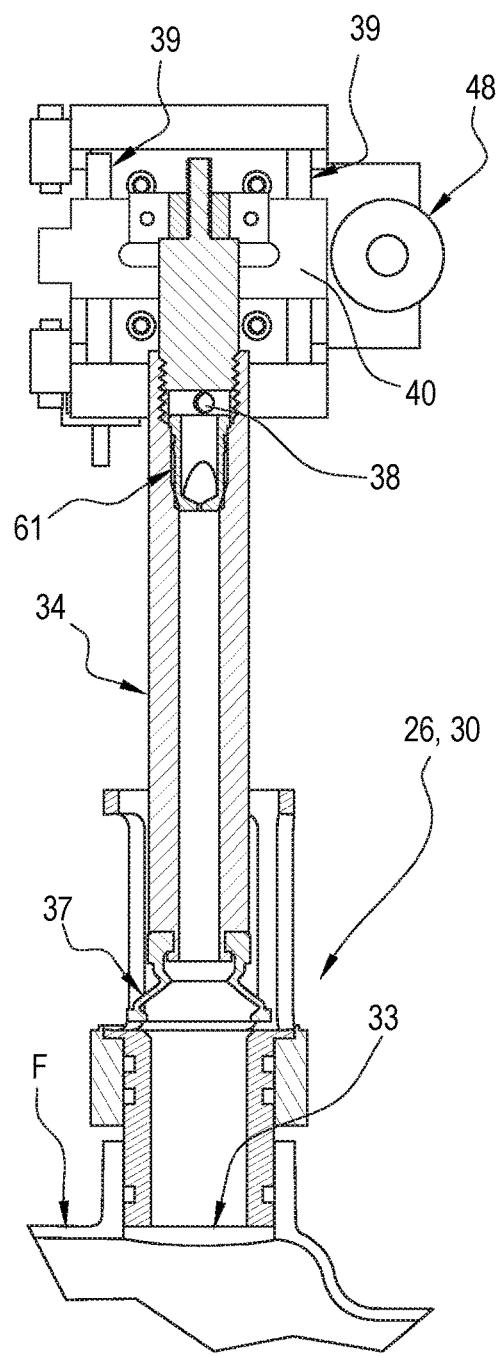
Figure 5:
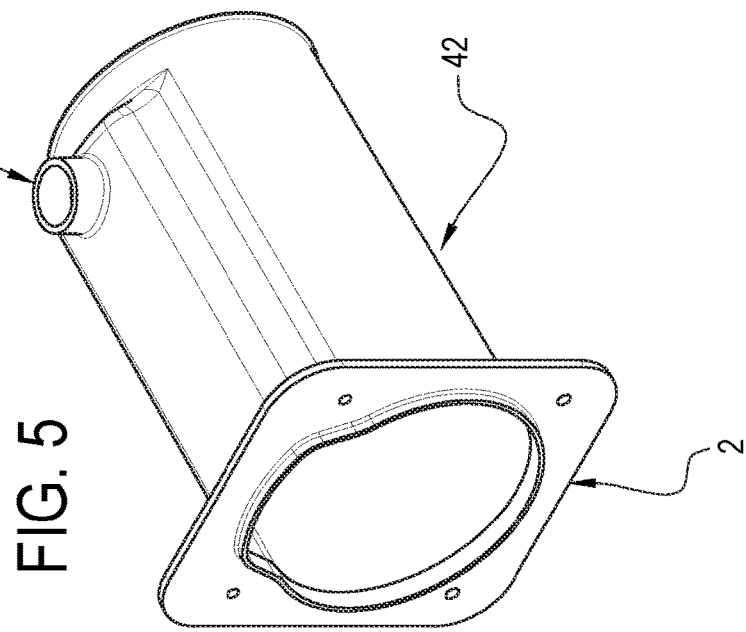
Figure 4:
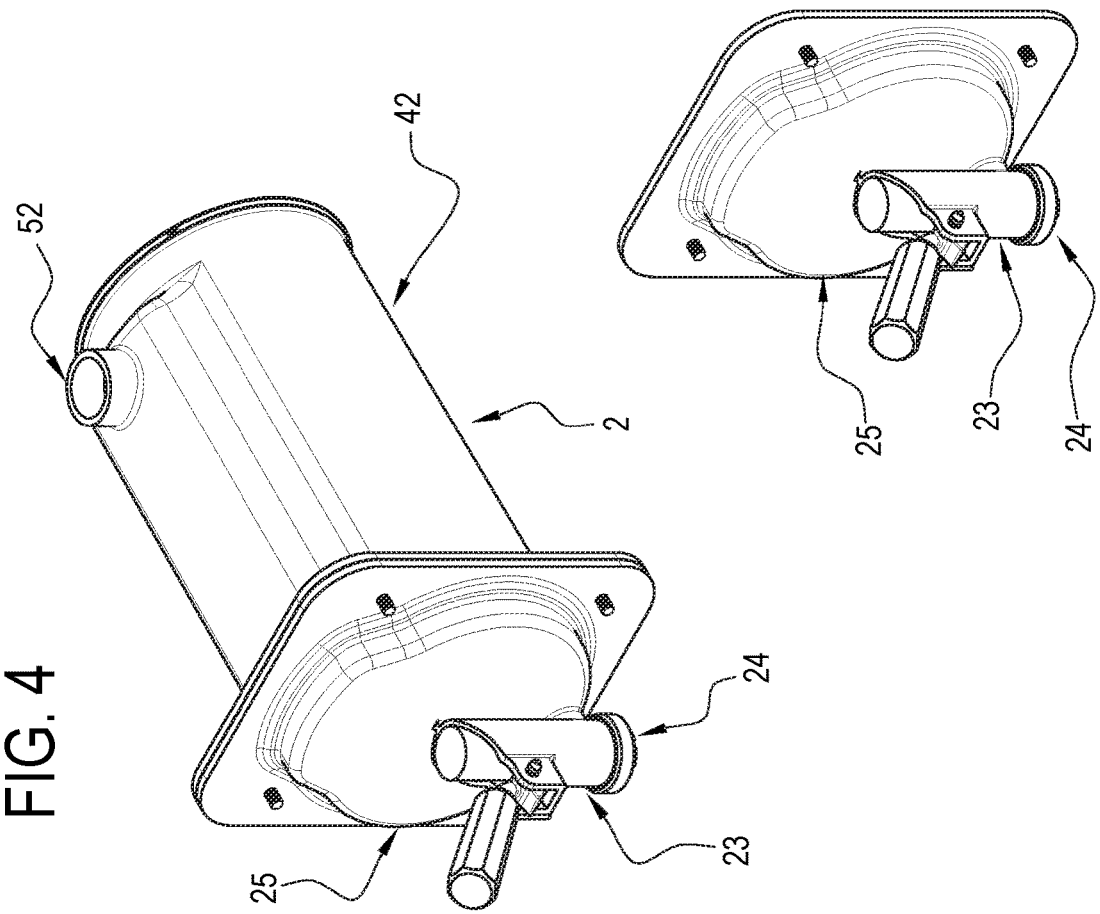

With reference to the accompanying drawings, the numeral 1 denotes a machine forming the object of this invention, for making liquid or semi-liquid products.

The machine is preferably adapted to make ice cream (artisan gelato or soft ice cream) or products for the ice cream trade (granitas, sorbets, etc.).

In the context of the invention, the term "ice cream" is used to mean a food preparation which is based on milk or milk-derived products and to which fruit, aromatics or other ingredients are added to obtain different flavors.

The machine 1 for making liquid or semi-liquid products comprises:

a first processing container 2 for processing a basic liquid or semi-liquid product and defining a processing chamber 3;

a cooling cylinder 20 mounted inside the first container 2;

a second processing container 21;

a connecting duct 52 between the first container 2 and the second container 21;

a dispensing device 23 associated with the first processing container 2 and configured, in a dispensing configuration, to deliver the liquid or semi-liquid product to the outside or, in an inhibiting configuration, to prevent the liquid or semi-liquid product from being dispensed;

a shutoff valve 26 configured, in a closed configuration, to close the connecting duct 52 between the first container 2 and the second container 21 or, in an open configuration, to open the connecting duct 52 between the first container 2 and the second container 21;

a control unit 60 operatively connected to the dispensing device 23 to detect the dispensing or inhibiting configuration thereof, and to the shutoff valve 26 in order to drive it between the closed configuration and the open configuration, the control unit 60 being configured to drive the shutoff valve 26 in such a way as to set it to the closed configuration if the dispensing device 23 is in the dispensing configuration.

According to another aspect, the machine comprises a rotary stirrer 5 mounted inside the chamber 3 (that is, inside the first processing container 2) and outside the cooling cylinder 20.

According to yet another aspect, the machine comprises a thermal treatment system 22 provided with at least a first exchanger associated with the cooling cylinder 20 (mounted inside the cooling cylinder 20 to cool and/or heat an outside surface of the cooling cylinder 20).

According to one aspect, the first processing container 2 for processing a basic liquid or semi-liquid product comprises a radially protruding longitudinal portion 2A defining a zone (between the front section and the rear section) for recirculating the basic liquid or semi-liquid product when the rotary stirrer 5 is set in rotation.

In other words, the portion 2A defines, along the main direction of extension of the processing container 2, a radial protrusion which also extends radially and along the main direction of extension of the processing container 2.

It should be noted that the radially protruding longitudinal portion 2A allows the food product inside the first container 2 to be recirculated by pushing it axially, that is, longitudinally, by effect of the rotational motion of the rotary stirrer 5 (thanks to at least one helical portion of the rotary stirrer 5).

In effect, the longitudinal portion 2A defines a compartment within which the product can move (longitudinally, that is, along the axis of the rotary stirrer 5, from the front section to the rear section) under the pushing action of the rotary stirrer 5.

This recirculating action allows optimum, uniform processing of the product, preventing the product from accumulating in the front zone (which would result in non-uniform temperature).

It should be noted that the heat exchanger 22A is mounted inside the cooling cylinder 20.

Preferably, the cooling cylinder 20 is made of metallic material.

According to another aspect, the first processing container 2 has, in transverse cross section, a first portion 2B which is substantially circular and a second portion 2A, connected thereto, which is irregular in shape (that is, the aforementioned radially protruding, longitudinal portion 2A) and which defines an external extension of the first portion 2B.

According to another aspect, the rotary stirrer 5 has a helically extending portion 5A.

The stirrer 5 preferably also comprises a pair of stiffening elements 5B, 5B extending longitudinally and coupled to the helical portion 5A in order to stiffen the helical portion 5A.

According to another aspect, the second container 21 is a tub-like container.

Preferably, the second container 21 is openable at the top.

It should be noted that the second container 21, too, has a stirrer mounted in it to stir the liquid or semi-liquid product present in the second container 21.

According to yet another aspect, the machine 1 comprises a second heat exchanger 22B associated with the second container 21.

Described below is the shutoff valve 26 according to the embodiment illustrated in the accompanying drawings.

The machine 1 comprises a transfer device 30 for transferring the basic liquid or semi-liquid product from the second container 21 to the first container 2.

The transfer device 30 comprises the duct 52 connecting the second container 21 to the first container 2.

The first container 2 has a first opening 32 made in it (the first opening 32 being preferably, but not necessarily, made in the radially protruding, longitudinal portion 2A).

The second container 21 has a second opening 33 made in it (the second opening 33 being preferably, but not necessarily, made on the bottom of the second container 21).

The connecting duct 52 connects the first opening 32 to the second opening 33.

It should be noted that there is a further duct 34 located inside the second container 21.

At the bottom of it, the further duct 34 terminates at the second opening 33.

The further duct 34 is internally hollow, that is to say, it has an internal cavity passing longitudinally through it.

The further duct 34 is movable vertically between a shutoff position, where the connection between the second container 21 and the first container 2 is closed, and an open position, where the connection between the second container 21 and the first container 2 is open.

It should also be noted that the further duct 34 has, at the bottom of it, a radially external sealing zone (this sealing zone being preferably defined by a gasket 37).

It should be noted that the gasket 37 is preferably internally hollow so that it can establish fluid communication, through its internal cavity, with the internal cavity of the duct 34.

It should be noted that the duct 34 is movable and defines the aforementioned shutoff valve 26 (the gasket 37 inhibits or establishes the connection between the second container 21 and the first container 2).

It should be noted that air is made to pass through the internal cavity of the duct 34.

In effect, at the top of it, the duct 34 has an opening 38 which allows air into the cavity of the duct 34 itself.

According to yet another aspect, the machine 1 comprises a one-way (non-return) valve associated with the duct 34, specifically with the opening 38 (at the top) to allow air to flow into the internal cavity of the duct 34 in one direction only.

The machine 1 also comprises an actuator 48 adapted to open and close the shutoff valve 26.

More specifically, in the embodiment illustrated in the accompanying drawings, the actuator 48 operates on the further duct 34 to allow movement (vertical) between the shutoff position for closing the passage of the basic liquid from the second container 21 to the first container 2 (through the connecting duct 52) and the open position for opening the passage of the basic liquid from the second container 21 to the first container 2 (through the connecting duct 52).

More precisely, the actuator 48 comprises a motor.

It should be noted that the actuator 48 also comprises a guide 39, more specifically, a pair of guides 39, and a slide 40 movably coupled to the guide 39.

It should be noted that the further duct 34 is connected (integrally) to the slide 40.

The guides 39 extend vertically.

The guides 39 are preferably connected integrally to the frame of the machine 1.

The motor is kinematically connected to the slide 40 to allow it to move relative to the guides 39.

According to another aspect, the dispensing device 23 comprises an outlet duct 24 and a shutter 42, mounted movably in the outlet duct 24 to close it or leave it open.

It should be noted that the shutter 42 can be actuated manually or automatically.

In order to dispense the product, the shutter 42 is moved to the open position and, preferably, the rotary stirrer 5 is set in rotation.

It should be noted that according to another aspect, the processing container 2 comprises a front portion 25 which is removable to allow the container 2 to be cleaned.

According to this aspect, the container 2 comprises a longitudinal portion 42, to the front of which the removable portion 25 is coupled.

The front portion 25 is therefore uncoupled from the longitudinal portion 42 only to allow the inside of the container 2 to be cleaned when the container 2 is empty.

During normal use, the liquid or semi-liquid product is dispensed through the outlet duct 24.

According to another aspect, the control unit 60 is configured to drive the shutoff valve 26 in such a way as to set it to the open configuration if the dispensing device 23 is in the inhibiting configuration.

In other words, advantageously, transfer of the liquid product from the second container 21 to the first container 2 is made possible when the dispensing device 23 is in the inhibiting configuration.

More precisely, the control unit 60 is configured to drive the shutoff valve 26 in such a way as to set it to the open configuration/position when the dispensing device 23 switches from the dispensing configuration to the inhibiting configuration.

In other words, when the dispensing device 23 is set to the inhibiting configuration, the control unit 60 is configured to drive the shutoff valve 26 in such a way as to set it to the open configuration/position.

Further, the control unit 60 is configured to keep the shutoff valve 26 in the open configuration/position for long enough to top up the first container 2 with the amount of liquid or semi-liquid product which has been dispensed from the first container 2.

It should be noted that the basic liquid or semi-liquid product is transferred together with air, which is allowed in through the opening 38 of the duct 34.

Figure 9:
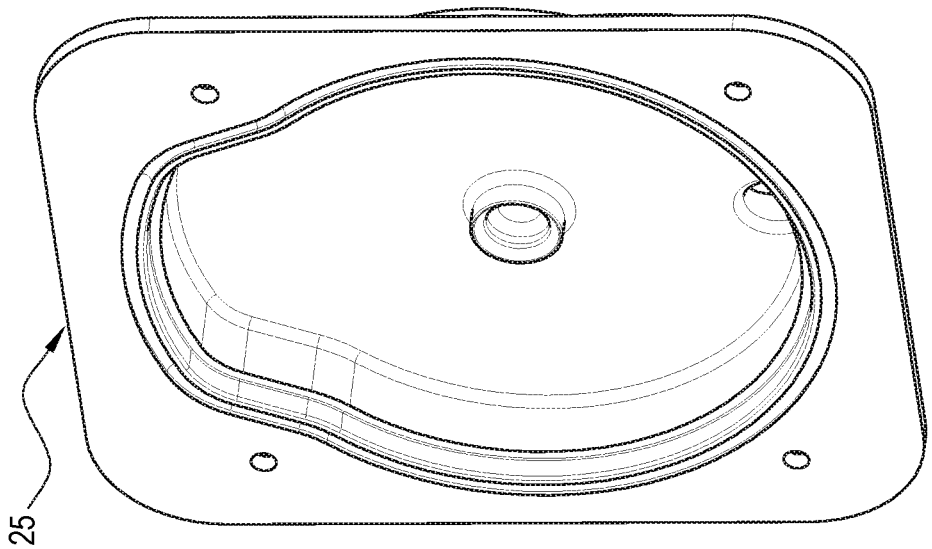
FIG. 9 shows a detail of a machine forming the object of this invention as shown in FIG. 1, according to a first embodiment.

FIG. 9 shows a first embodiment of the front portion 25 (door) which is removable to allow cleaning the processing container 2.

It should be noted that according to this embodiment, the front portion 25 (door) has a cavity made in it whose shape, in cross section, is substantially mirror symmetrical to that of the container 2, in cross section.

In other words, the cavity comprises a circular edge portion having a radially protruding region.

Figure 10:
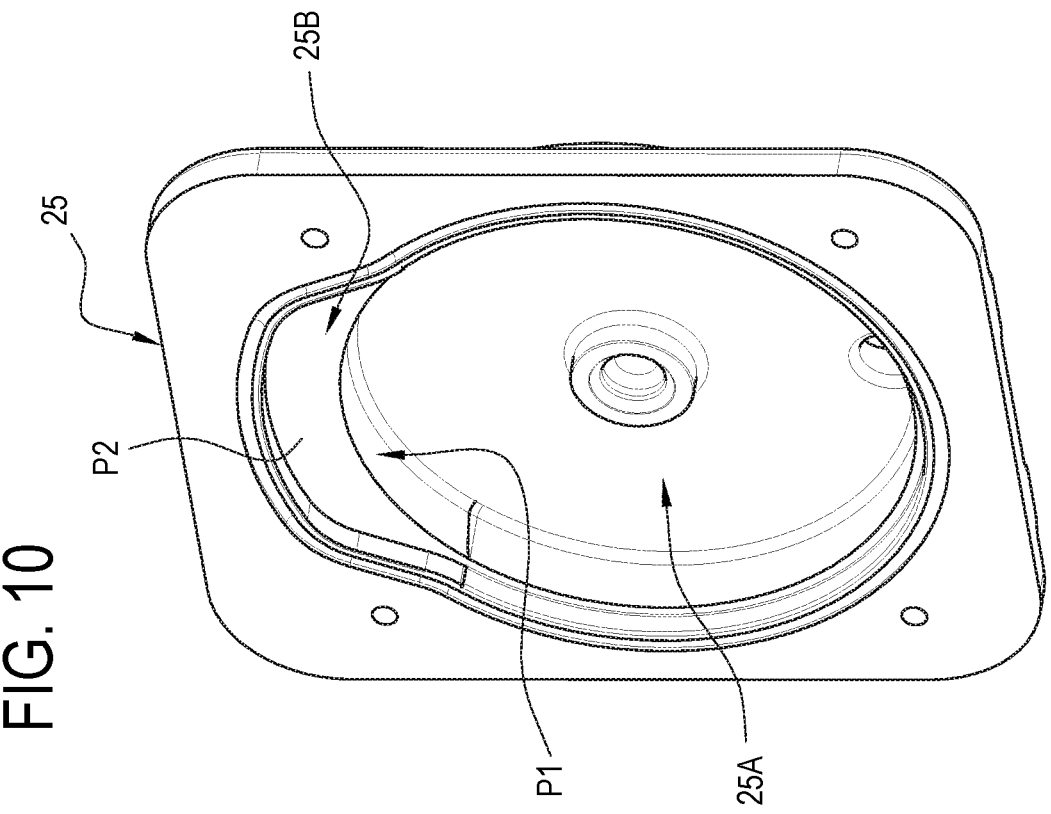
FIG. 10 shows a detail of a machine forming the object of this invention as shown in FIG. 1, according to a second embodiment.

FIG. 10 shows a second embodiment of the front portion 25 (door) which is removable to allow cleaning the processing container 2.

It should be noted that according to this embodiment, the front portion 25 (door) has a first cavity 25A made in it whose shape, in cross section, is circular. The front portion 25 (door) comprises a second cavity 25B, less deep than, and separate from, the first cavity 25A.

The second cavity 25B is separated from the first cavity 25A by a pair of walls P1, P2.

Advantageously, defined according to the invention is a method for making liquid or semi-liquid products, comprising the following steps:

preparing a machine 1 comprising:

a first processing container 2 for processing a basic liquid or semi-liquid product and defining a processing chamber 3;

a cooling cylinder 20 mounted inside the first container 2;

a second processing container 21;

a dispensing device 23 associated with the first processing container 2 and configured, in a dispensing configuration, to deliver the liquid or semi-liquid product to the outside or, in an inhibiting configuration, to prevent the liquid or semi-liquid product from being dispensed;

placing a basic liquid or semi-liquid product inside the second processing container 21;

stirring and thermally treating the basic liquid or semi-liquid product inside the second processing container 21;

after stirring and thermally treating it, transferring the basic liquid or semi-liquid product from the second processing container 21 to the first processing container 2 when the dispensing device 23 is in the inhibiting configuration;

stirring and thermally treating the basic liquid or semi-liquid product inside the first processing container 2;

setting the dispensing device 23 to the dispensing configuration to allow dispensing the liquid or semi-liquid product from the first processing container 2 while inhibiting transfer of the basic liquid or semi-liquid product from the second processing container 21 to the first container 2;

dispensing the liquid or semi-liquid product through the dispensing device 23.

According to another aspect of the method, the machine 1 comprises a shutoff valve 26 configured to close a connecting duct 52 between the first container 2 and the second container 21 and the step of inhibiting transfer of the basic liquid or semi-liquid product from the second processing container 21 to the first processing container 2 comprises a step of closing the valve 26 and the step of transferring the basic liquid or semi-liquid product from the second processing container 21 to the first processing container 2, after stirring and thermal treatment, comprises a step of opening the valve 26.

According to another aspect, the shutoff valve 26 is defined by a duct 34 provided with an internal longitudinal through cavity, the further duct 34 being movable vertically between a closed position where the connecting duct 52 is closed and an open position where the connecting duct 52 is open, and the step of closing the valve 26 comprises a step of setting the duct 34 to the closed position and the step of opening the valve 26 comprises a step of setting the duct 34 to the open position.

According to another aspect, the step of transferring the basic liquid or semi-liquid product from the second processing container 21 to the first processing container 2, after stirring and thermal treatment, comprises a step of letting air into the internal cavity of the duct 34 in order to allow the air to be mixed into the liquid or semi-liquid product being transferred from the second processing container 21 to the first processing container 2.

According to another aspect, the step of letting air into the internal cavity of the duct 34 comprises a step of causing the air to pass through a one-way valve 61 associated with the duct 34.

According to yet another aspect, the step of setting the dispensing device 23 to the dispensing configuration to allow dispensing the liquid or semi-liquid product from the first processing container 2 while inhibiting transfer of the basic liquid or semi-liquid product from the second processing container 21 to the first container 2, comprises a step of dispensing a desired quantity of liquid or semi-liquid product, followed, at the end of the step of dispensing a desired quantity of liquid or semi-liquid product, by a step of setting the dispensing device 23 to the inhibiting configuration and then transferring from the second processing container 21 to the first processing container 2 a quantity of liquid or semi-liquid product substantially equal to the desired quantity of liquid or semi-liquid product dispensed so as to top up the first container 2 with the same amount of liquid or semi-liquid product as that dispensed.

It should be noted therefore that each time the product is dispensed, the first container 2 is topped up with the same amount of product as that dispensed (by transferring it from the second container 21 to the first container 2).

More specifically, therefore, the duct 34 is moved from the closed position to the open position for long enough to transfer to the first container 2 a quantity of basic liquid or semi-liquid product sufficient to replace the liquid or semi-liquid product which has been dispensed.

That way, the amount of liquid or semi-liquid product inside the first container 2 is kept substantially constant.

According to another aspect, the following of the aforementioned steps are carried out cyclically and in sequence:

setting the dispensing device 23 to the dispensing configuration to allow dispensing the liquid or semi-liquid product from the first processing container 2 while inhibiting transfer of the basic liquid or semi-liquid product from the second processing container 21 to the first container 2;

and setting the dispensing device 23 to the inhibiting configuration and then transferring from the second processing container 21 to the first processing container 2 a quantity of liquid or semi-liquid product substantially equal to the desired quantity of liquid or semi-liquid product dispensed so as to top up the first container 2 with the same amount of liquid or semi-liquid product as that dispensed.

According to another aspect, the method comprises a step of stopping the transfer of basic liquid or semi-liquid product from the second processing container 21 to the first container 2, this step being carried out after the steps of setting the dispensing device 23 to the inhibiting configuration and then transferring from the second processing container 21 to the first processing container 2 a quantity of liquid or semi-liquid product substantially equal to the desired quantity of liquid or semi-liquid product dispensed so as to top up the first container 2 with the same amount of liquid or semi-liquid product as that dispensed.

Advantageously, the invention provides a machine 1 and a method which guarantee quality/repeatability of the finished product while at the same time reducing overall serving times (bearing in mind that the amount of liquid topped up must be frozen before being served).

Advantageously, this type of machine is capable of making ice cream products (traditional and/or soft ice cream) as well as frozen products for the ice cream trade (e.g. granitas).

What is claimed is:

1. A method for making liquid or semi-liquid products, comprising the following steps:
    providing a machine comprising:
        a first processing container for processing a basic liquid or semi-liquid product and defining a processing chamber;
        a cooling cylinder mounted inside the first container;
        a second processing container;
        a rotary stirrer mounted inside the first processing container and inside the processing chamber and outside the cooling cylinder, the rotary stirrer being rotatable about a horizontal axis;
        a valve mechanism including:
            a shutoff valve positioned and configured to axially move between open and closed positions to respectively open and close a connecting duct between an interior of the second container and the first container;
            a further duct connected between the shutoff valve and an actuator including a motor; the further duct axially movable by the actuator along an axis of the further duct to move the shutoff valve between the open and closed positions; the further duct including an upstream end adjacent the actuator, a downstream end adjacent the shutoff valve and an internal longitudinal through cavity between the upstream end and the downstream end;
            a one-way valve positioned at the upstream end to allow air into the internal through cavity;
            wherein the shutoff valve is actuatable independently of actuation of the rotary stirrer;
        a dispensing device operatively connected to the first processing container and configured, in a dispensing configuration, to deliver the liquid or semi-liquid product to an exterior of the machine or, in an inhibiting configuration, to prevent the liquid or semi-liquid product from being dispensed;
    placing a basic liquid or semi-liquid product inside the second processing container;
    stirring and thermally treating the basic liquid or semi-liquid product inside the second processing container;
    transferring the basic liquid or semi-liquid product from the second processing container to the first processing container with the dispensing device in the inhibiting configuration;
    stirring and thermally treating the basic liquid or semi-liquid product inside the first processing container;
    setting the dispensing device to the dispensing configuration to allow dispensing the liquid or semi-liquid product from the first processing container while inhibiting transfer of the basic liquid or semi-liquid product from the second processing container to the first container.

2. The method according to claim 1, wherein the step of setting the dispensing device to the dispensing configuration to allow dispensing the liquid or semi-liquid product from the first processing container while inhibiting transfer of the basic liquid or semi-liquid product from the second processing container to the first container comprises a step of dispensing a desired quantity of liquid or semi-liquid product, followed, at an end of the step of dispensing the desired quantity of liquid or semi-liquid product, by a step of setting the dispensing device to the inhibiting configuration and then transferring from the second processing container to the first processing container a quantity of liquid or semi-liquid product substantially equal to a desired quantity of liquid or semi-liquid product dispensed so as to top up the first processing container with a same amount of liquid or semi-liquid product as that dispensed.

3. The method according to claim 2, wherein the following steps are carried out cyclically and in sequence:
    the step of setting the dispensing device to the dispensing configuration to allow dispensing the liquid or semi-liquid product from the first processing container while inhibiting transfer of the basic liquid or semi-liquid product from the second processing container to the first container; and
    the step of setting the dispensing device to the inhibiting configuration and then transferring from the second processing container to the first processing container the quantity of liquid or semi-liquid product substantially equal to the desired quantity of liquid or semi-liquid product dispensed so as to top up the first container with the same amount of liquid or semi-liquid product as that dispensed.

4. The method according to claim 2, and further comprising a step of stopping the transfer of basic liquid or semi-liquid product from the second processing container to the first container, this step being carried out after the steps of setting the dispensing device to the inhibiting configuration and then transferring from the second processing container to the first processing container the quantity of liquid or semi-liquid product substantially equal to the desired quantity of liquid or semi-liquid product dispensed so as to top up the first container with the same amount of liquid or semi-liquid product as that dispensed.

5. The method according to claim 4, wherein the step of inhibiting transfer of the basic liquid or semi-liquid product from the second processing container to the first processing container comprises a step of closing the shutoff valve and the step of transferring the basic liquid or semi-liquid product from the second processing container to the first processing container comprises a step of opening the shutoff valve.

6. The method according to claim 5, wherein the step of closing the shutoff valve comprises a step of setting the shutoff valve to the closed position and the step of opening the shutoff valve comprises a step of setting the shutoff valve to the open position.

7. The method according to claim 6, wherein the step of transferring the basic liquid or semi-liquid product from the second processing container to the first processing container after stirring and thermal treatment comprises a step of letting air into the internal longitudinal through cavity of the further duct to allow the air to be mixed into the liquid or semi-liquid product being transferred from the second processing container to the first processing container.

8. The method according to claim 7, wherein the step of letting air into the internal longitudinal through cavity of the further duct comprises a step of causing the air to pass through the one-way valve.

9. A machine for making liquid or semi-liquid products, comprising:
a first processing container for processing a basic liquid or semi-liquid product and defining a processing chamber;
a cooling cylinder mounted inside the first container;
a rotary stirrer mounted inside the first processing container and inside the processing chamber and outside the cooling cylinder, the rotary stirrer being rotatable about a horizontal axis;
a second processing container;
a connecting duct between the first container and the second container;
a dispensing device associated with the first processing container and configured, in a dispensing configuration, to deliver the liquid or semi-liquid product to an exterior of the machine or, in an inhibiting configuration, to prevent the liquid or semi-liquid product from being dispensed;
a valve mechanism including:
a shutoff valve positioned and configured to axially move between open and closed positions to respectively open and close the connecting duct;
a further duct connected between the shutoff valve and an actuator including a motor; the further duct axially movable by the actuator along an axis of the further duct to move the shutoff valve between the open and closed positions; the further duct including an upstream end adjacent the actuator, a downstream end adjacent the shutoff valve and an internal longitudinal through cavity between the upstream end and the downstream end;
a one-way valve positioned at the upstream end to allow air into the internal through cavity;
wherein the shutoff valve is actuatable independently of actuation of the rotary stirrer;
a control unit operatively connected to the dispensing device to detect the dispensing or inhibiting configuration thereof, and to the shutoff valve to drive the shutoff valve between the closed configuration and the open configuration, the control unit being configured to drive the shutoff valve to set the shutoff valve to the closed configuration if the dispensing device is in the dispensing configuration.

10. The machine according to claim 9, wherein the control unit is configured to drive the shutoff valve to set the shutoff valve to the open configuration when the dispensing device is in the inhibiting configuration.

11. The machine according to claim 9, wherein the control unit is configured to drive the one way shutoff valve to set the shutoff valve to the open configuration when the dispensing device switches from the dispensing configuration to the inhibiting configuration.

12. The machine according to claim 9, and further comprising a gasket fitted to the further duct and including a through cavity in fluid connection with the internal longitudinal through cavity of the further duct, the gasket being sized to come into abutment with a bottom of the second container when the further duct is in the closed position and to prevent passage of the liquid or semi-liquid product from the second container to the first container.

13. The machine according to claim 9, wherein the further duct includes an upper air inlet opening in fluid communication with the internal longitudinal through cavity.

14. The machine according to claim 13, wherein the one-way valve operatively connects with the upper air inlet opening to allow air into the internal longitudinal through cavity.

15. A machine for making liquid or semi-liquid products, comprising:
a first processing container for processing a basic liquid or semi-liquid product and defining a processing chamber;
a rotary stirrer mounted inside the first processing container;
a cooling cylinder mounted inside the first container;
a second processing container;
a connecting duct between the first container and the second container;
a dispensing device associated with the first processing container and configured, in a dispensing configuration, to deliver the liquid or semi-liquid product to an exterior of the machine or, in an inhibiting configuration, to prevent the liquid or semi-liquid product from being dispensed;
a shutoff valve configured, in a closed configuration, to close the connecting duct between the first container and the second container or, in an open configuration, to open the connecting duct between the first container and the second container;
a control unit operatively connected to the dispensing device to detect the dispensing or inhibiting configuration thereof, and to the shutoff valve to drive the shutoff valve between the closed configuration and the open configuration, the control unit being configured to drive the shutoff valve to set the shutoff valve to the closed configuration if the dispensing device is in the dispensing configuration;
wherein the shutoff valve is defined by a further duct including an internal longitudinal through cavity, the further duct being movable vertically between a closed position where the connecting duct is closed and an open position where the connecting duct is open;
wherein the further duct includes an upper air inlet opening in fluid communication with the internal longitudinal through cavity;
a one-way valve associated with the upper air inlet opening to allow air into the internal longitudinal through cavity;
wherein the first processing container includes a radially protruding longitudinal portion defining a zone for recirculating the basic liquid or semiliquid product when the rotary stirrer is set in rotation.

* * * * *